(12) United States Patent
Tanaka et al.

(10) Patent No.: US 7,404,741 B2
(45) Date of Patent: Jul. 29, 2008

(54) MEMORY CARD ADAPTOR

(75) Inventors: Akihiro Tanaka, Osaka (JP); Yasuo Nakai, Osaka (JP)

(73) Assignee: Hosiden Corporation, Yao-shi, Osaka (JP)

( * ) Notice: Subject to any disclaimer, the term of this patent is extended or adjusted under 35 U.S.C. 154(b) by 0 days.

(21) Appl. No.: 11/540,728

(22) Filed: Oct. 2, 2006

(65) Prior Publication Data

US 2007/0077822 A1 Apr. 5, 2007

(30) Foreign Application Priority Data

Sep. 30, 2005 (JP) ............................. 2005-285717

(51) Int. Cl.
*H01R 24/00* (2006.01)
(52) U.S. Cl. ................... 439/630; 439/638; 439/946
(58) Field of Classification Search ................ 439/630, 439/945, 638, 946
See application file for complete search history.

(56) References Cited

U.S. PATENT DOCUMENTS 5,391,083 A * 2/1995 Roebuck et al. ............ 439/76.1
5,901,049 A * 5/1999 Schmidt et al. ............. 361/787
6,674,652 B2 * 1/2004 Forte et al. .................. 361/800
2004/0235353 A1 * 11/2004 Katsumata et al. .......... 439/630

FOREIGN PATENT DOCUMENTS

| JP | 2004272704 | 9/2004 |
| JP | 2005-50280 | 2/2005 |
| WO | WO 2004/070889 A1 | 8/2004 |
| WO | WO 2004/081858 A1 | 9/2004 |

* cited by examiner

*Primary Examiner*—Renee Luebke
*Assistant Examiner*—Vanessa Girardi
(74) *Attorney, Agent, or Firm*—Bacon & Thomas, PLLC

(57) ABSTRACT

A memory card adaptor which enables a small memory card to be used in a card connector for a large memory card that is larger than the small memory card. In the surface of a metal cover which cooperates with a resin base to constitute an adaptor body having a shape corresponding to an outer shape of a large memory card, steps are disposed by partly reducing the material thickness of the cover. Insulating layers the thickness of which are equal to less than the steps are formed on the surface of the thinned cover to dispose insulation areas on the side of one face of the adaptor, whereby the insulation areas are arbitrarily set on the side of the one face of the adaptor without increasing the thickness of the adaptor, and while maintaining the rigidity of the adaptor.

3 Claims, 13 Drawing Sheets

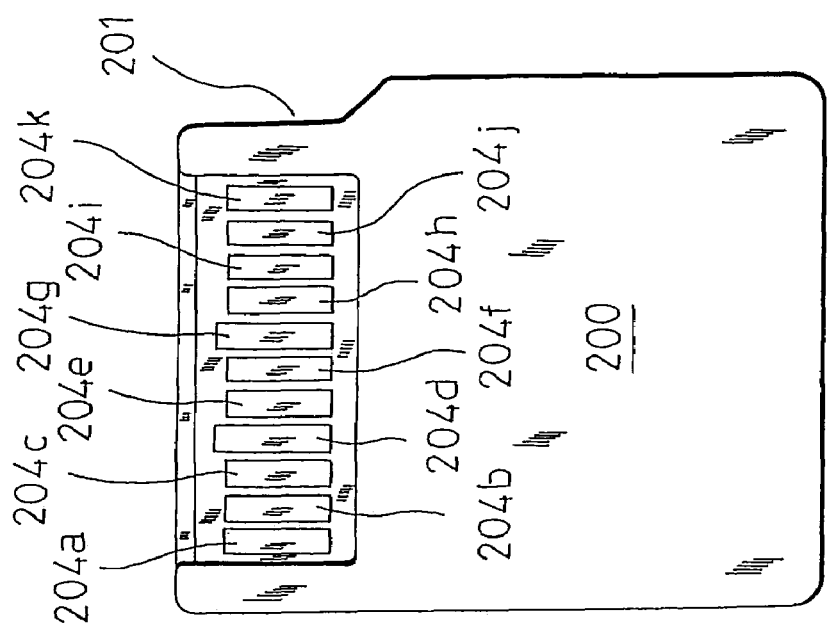
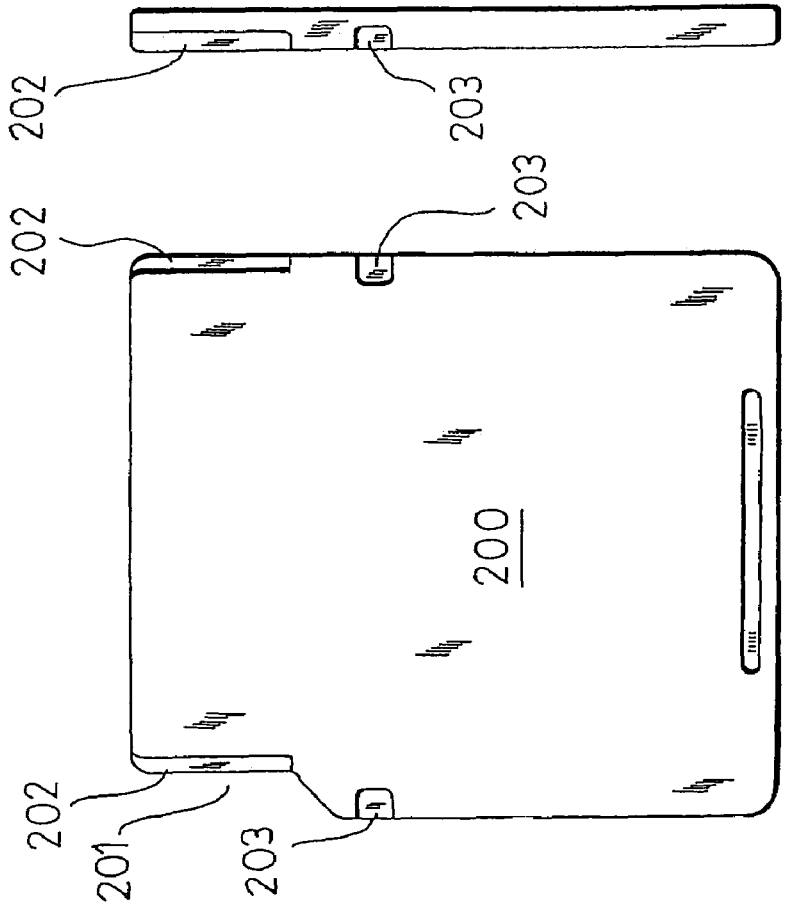
Fig.12A  Fig.12B  Fig.12C

MEMORY CARD ADAPTOR

BACKGROUND OF THE INVENTION

1. Filed of the Invention

The present invention relates to a memory card adaptor which enables a small memory card to be used in a card connector for a large memory card that is larger than the small memory card.

2. Description of the Prior Art

Conventionally, as a downsized version of an SD card (24×32×2.1 mm: length×width×thickness), a mini SD card (20×21.5×1.4 mm: length×width×thickness) 200 shown in FIGS. 12A, 12B, and 12C has been provided. In the rear face side of an end portion of the front side of the mini SD card 200 in the case where the mini SD card is inserted in the normal insertion posture (hereinafter, the front side in this case is referred to as "rear side"), eleven contacts 204a to 204k are juxtaposed in a direction (hereinafter, referred to as "lateral direction") which is perpendicular to the longitudinal direction and the thickness direction. In the rear side of the mini SD card 200, a cut-away portion 201 is formed by cutting away one edge. A step portion 202 which is upward directed is formed in each of the right and left side edges of the surface side of the rear end portion of the mini SD card 200 in which the width is narrowed by the cut-away portion 201. The cut-away portion 201 cooperates with the step portions 202 to prevent erroneous insertion of the mini SD card 200 into a card connector in a posture other than the normal insertion posture (insertion in a posture where the front and rear relationship and the front and back relationship are inverted) from occurring. A locking cut-away 203 is disposed in each of the right and left sides of the surface of the mini SD card 200 in a wider portion which is in front of the cut-away portion 201, so that, when the mini SD card 200 is attached to the card connector, locking members of the card connector are engaged with the locking cut-aways 203, thereby preventing the mini SD card 200 from dropping off. In the eleven contacts 204a to 204k of the mini SD card 200, the first to eleventh contacts 204a to 204k are sequentially arranged in a direction from left to right as seen from the side of the rear face, four or the first, second, tenth, and eleventh contacts 204a, 204b, 204j, 204k are used for data, the third contact 204c is used for a command, two or the fourth and ninth contacts 204d, 204i are used for grounding, the seventh contact 204g is used for power supply, and the eighth contact 204h is used for a clock signal. The two or the fifth and sixth contacts 204e, 204f are preliminarily added to the mini SD card 200. The effective contacts are nine so as to correspond to the nine contacts of the SD card.

As a memory card which is smaller than the mini SD card 200, a TransFlash card, and a micro SD card (11×15×1 mm: length×width×thickness) 300 shown in FIGS. 13A, 13B, and 13C in which the TransFlash specification is adopted have been provided. In the rear face side of an end portion of the front side of the micro SD card 300 in the case where the micro SD card is inserted in the normal insertion posture (hereinafter, the front side in this case is referred to as "rear side"), eight contacts 303a to 303h are juxtaposed in a direction (hereinafter, referred to as "lateral direction") which is perpendicular to the longitudinal direction and the thickness direction. In the rear side of the micro SD card 300, a cut-away portion 301 for preventing erroneous insertion is formed by cutting away one edge. A locking cut-away 302 is disposed in one side portion of the micro SD card 300 on the side of the cut-away portion 301 and in a wider portion which is in front of the cut-away portion 301. In the eight contacts 303a to 303h of the micro SD card 300, the first to eighth contacts 303a to 303h are sequentially arranged in a direction from left to right as seen from the side of the rear face, four or the first, second, seventh, and eighth contacts 303a, 303b, 303g, 303h are used for data, the third contact 303c is used for a command, the fourth contact 303d is used for power supply, the fifth contact 303e is used for a clock signal, and the sixth contact 303f is used for grounding. In the micro SD card 300, namely, the grounding contact is reduced to one, and the number of contacts is reduced to eight as compared with the case where an SD card and the mini SD card 200 have the nine contacts (in the mini SD card 200, the number of effective contacts).

As described above, miniaturization of memory cards is advancing. In order to enable a small memory card to be used in a card connector for a large memory card that is larger than the small memory card, a memory card adaptor for this purpose is required. In such an adaptor, the adaptor body is inevitably formed so as to have a shape corresponding to the outer shape of the large memory card. Memory cards are originally thin. As a result of miniaturization, the longitudinal and lateral dimensions are considerably reduced, but a large difference is not produced in thickness. Therefore, an outer peripheral portion (front and rear faces) of a housing space for a small memory card is thinned, and as a result there arises a problem in that it is difficult to maintain rigidity.

In order to solve the problem, a conventional memory card adaptor is often formed so that a rear face side (the side of the face where internal contacts are exposed in one end portion) of the adaptor body is configured by a resin base, and a metal cover is used in a thin portion of the surface side (for example, see Japanese Patent Application Laying-Open No. 2005-50280).

SUMMARY OF THE INVENTION

The problem to be solved by the invention is as follows. In a conventional memory card adaptor, an adaptor body is configured by a resin base, and a metal cover as described above. It is specified that the surface of the adaptor body, i.e., the surface of the adaptor has an area which is required for electrical insulation (hereinafter, referred to as electrical insulation required area). When the metal cover is used only outside the electrical insulation required area, it is impossible to attain the original object of maintaining the rigidity of the adaptor.

In order to solve the problem, the invention provides a memory card adaptor which enables a small memory card to be used in a card connector for a large memory card that is larger than the small memory card, the adaptor has an adaptor body constituted by a surface of a metal cover which cooperates with a resin base, the adaptor body having a shape corresponding to an outer shape of the large memory card. The adaptor also has a step disposed by partly reducing a material thickness of the cover, an insulating layer, a thickness of which is equal to less than the step formed on a surface of the thinned cover, and an arbitrary insulation area disposed on the surface of the metal cover which cooperates with the base to constitute the adaptor body. The metal cover is used in an area including an electrical insulation required area on a side of one face of the adaptor. The thickness of the adaptor is specified in the standards. When a metal cover in which an insulating layer is formed on the whole surface, the material thickness of the whole cover must be reduced by a dimension corresponding to the insulating layer. This causes the rigidity of the adaptor to be reduced. In other words, in order to maintain the rigidity of the adaptor, the thickness of the adaptor must be increased. By contrast, in the invention, the step is disposed not by reducing the thickness over the whole surface of the metal cover, but by partly reducing the material thickness of the cover, and the insulating layer the thickness of which is equal to less than the step is formed on the surface of the thinned cover, whereby an arbitrary insulation area is disposed on the surface of the metal cover with reducing the rigidity of the adaptor as little as possible, and without increasing the thickness of the adaptor.

BRIEF DESCRIPTION OF THE DRAWINGS

FIG. 12A is a front face view of a mini SD card, FIG. 12B is a side view of the mini SD card, and FIG. 12C is a rear face view of the mini SD card.

DETAILED DESCRIPTION OF THE PREFERRED EMBODIMENT

Figure 1:
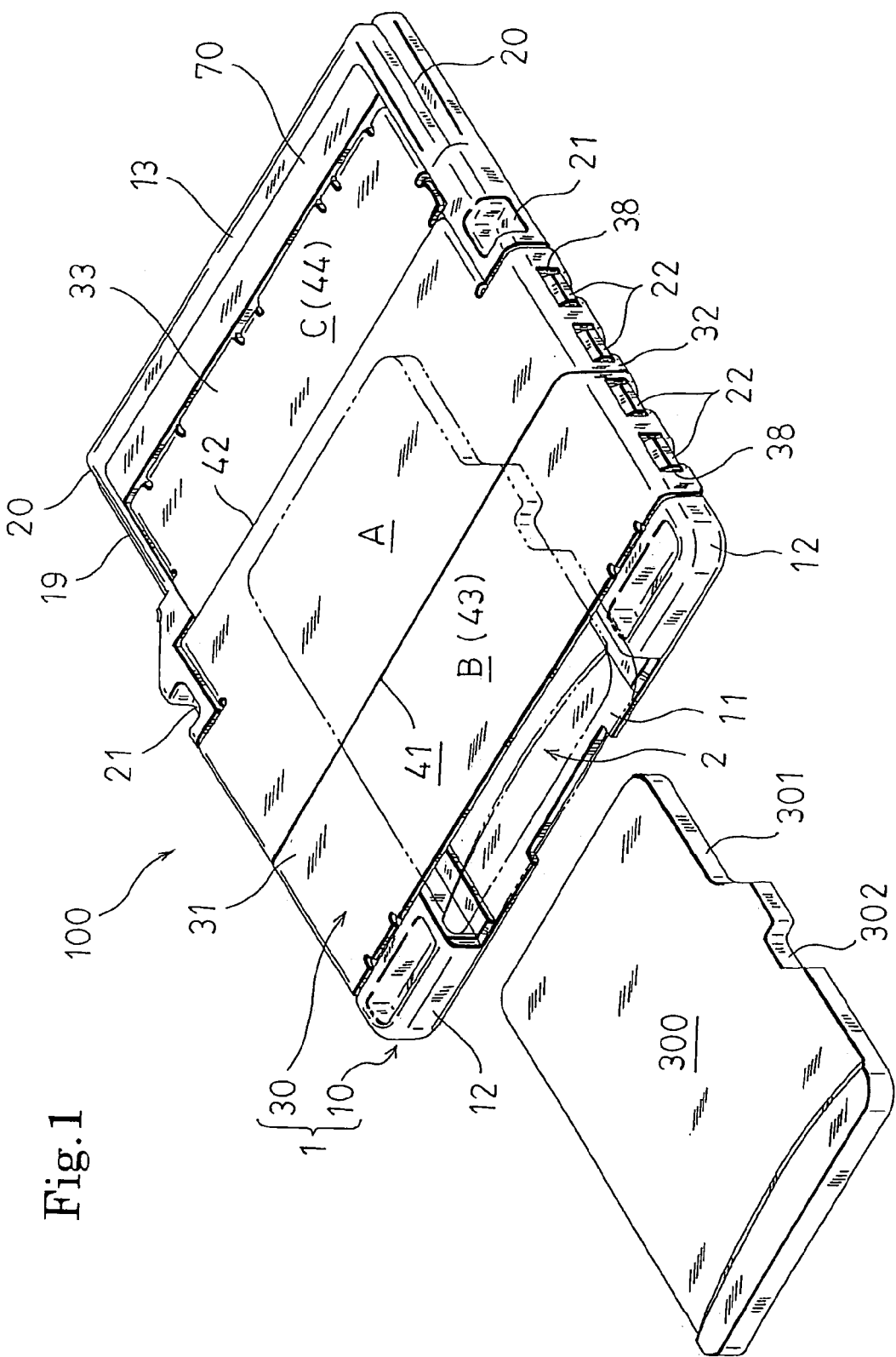
FIG. 1 is an external perspective view of a surface side of a memory card adaptor of an embodiment of the invention.

Hereinafter, an embodiment of the invention will be described with reference to the accompanying drawings. An adaptor 100 of the embodiment is used so that the micro SD card 300 which is a small memory card is attached to the adaptor, and the micro SD card is enabled to be used in a card connector for the mini SD card 200 which is a card connector for a larger memory card. The memory card adaptor is configured by: a mini SD card type adaptor body 1 which is shown in FIGS. 1 and 2, which is formed to have outer dimensions (the dimensions of the length, the width, and the thickness) that are substantially identical with those of the mini SD card 200, in order to cope with the mini SD card specification, and to which the micro SD card 300 is to be attached; a contact set 50 which is shown in FIGS. 3, 4, 8A, and 8B, and which is incorporated in the adaptor body 1; and a locking member 90 which is shown in FIGS. 3 and 4.

Figure 2:
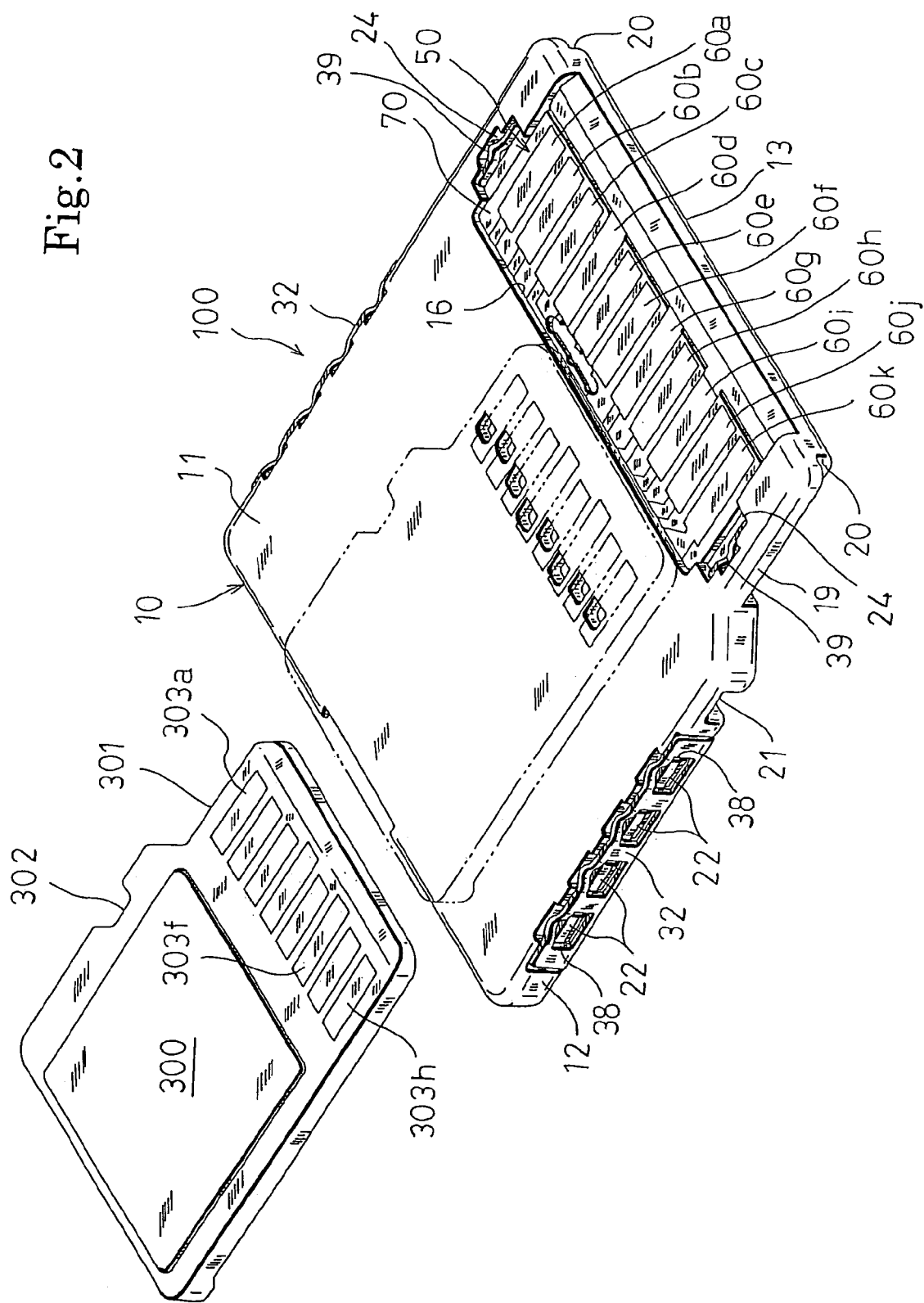
FIG. 2 is an external perspective view of a rear face side of the adaptor.
Figure 3:
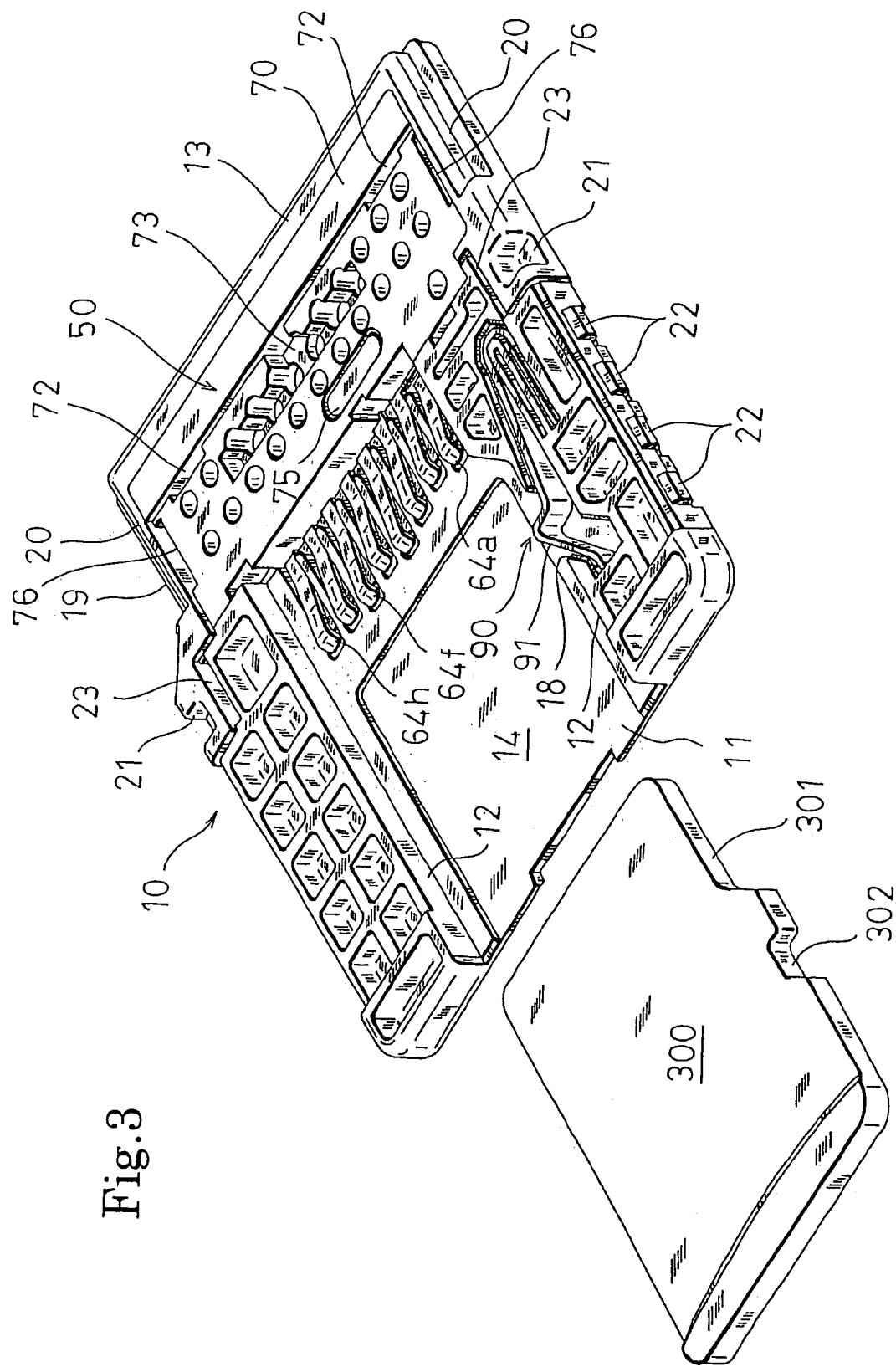
FIG. 3 is a perspective view showing an internal structure of the adaptor.
Figure 4:
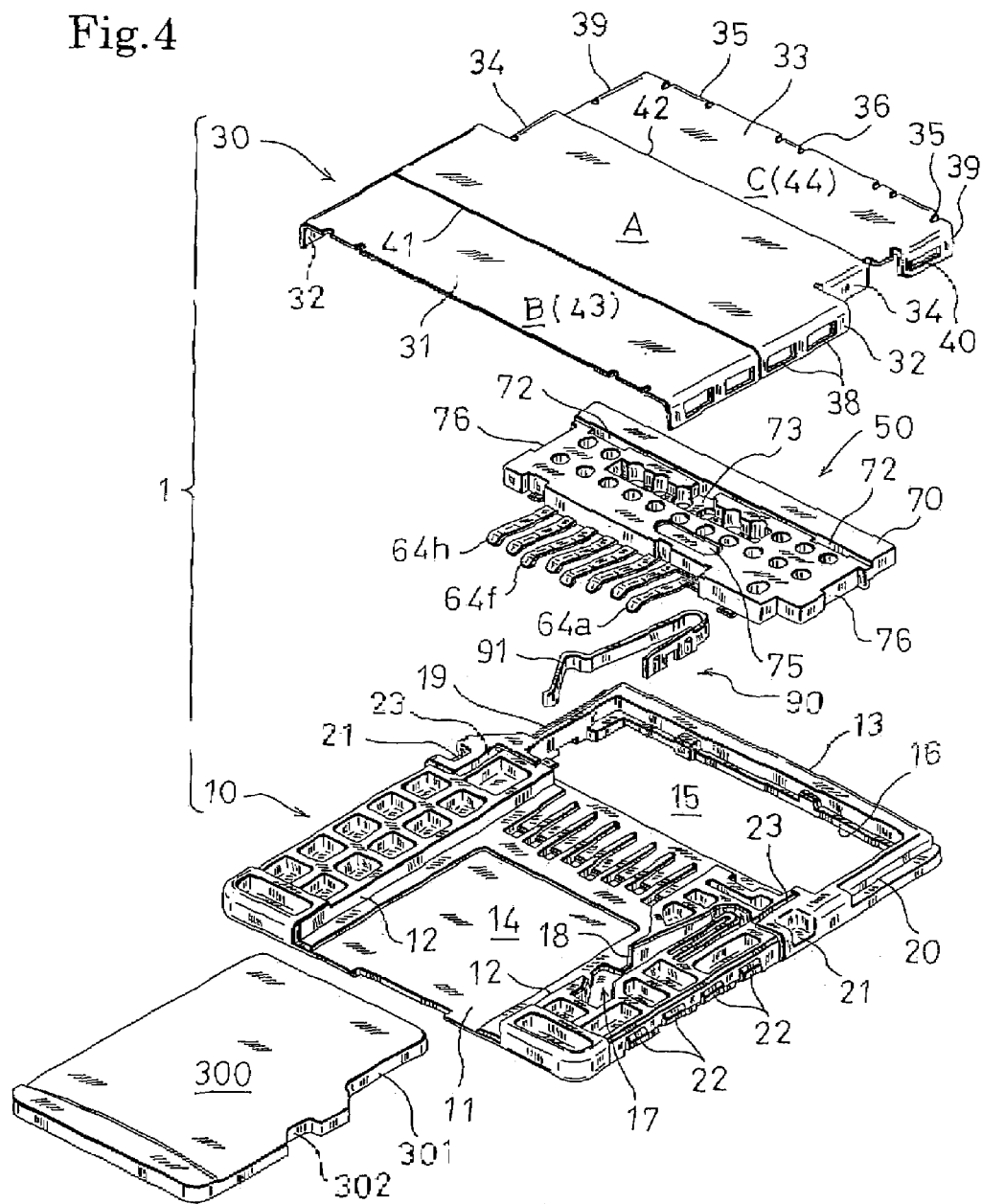
FIG. 4 is a perspective view showing a disassembled state of the adaptor.
Figure 5A:
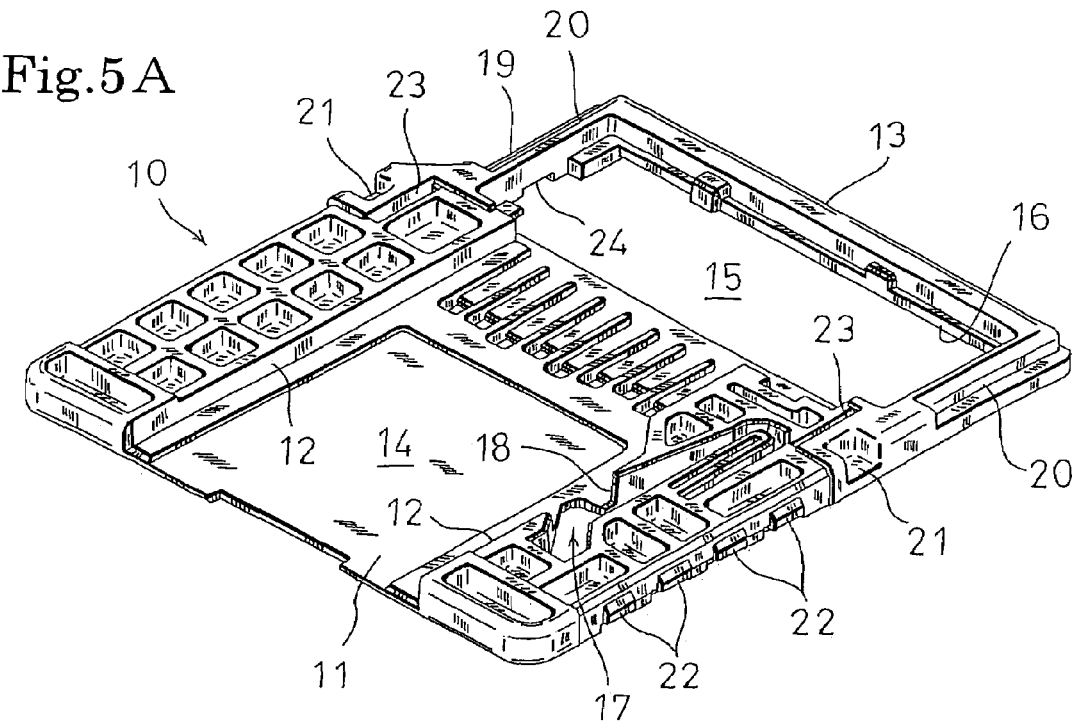
FIG. 5A is an external perspective view of a surface side of a base.
Figure 5B:
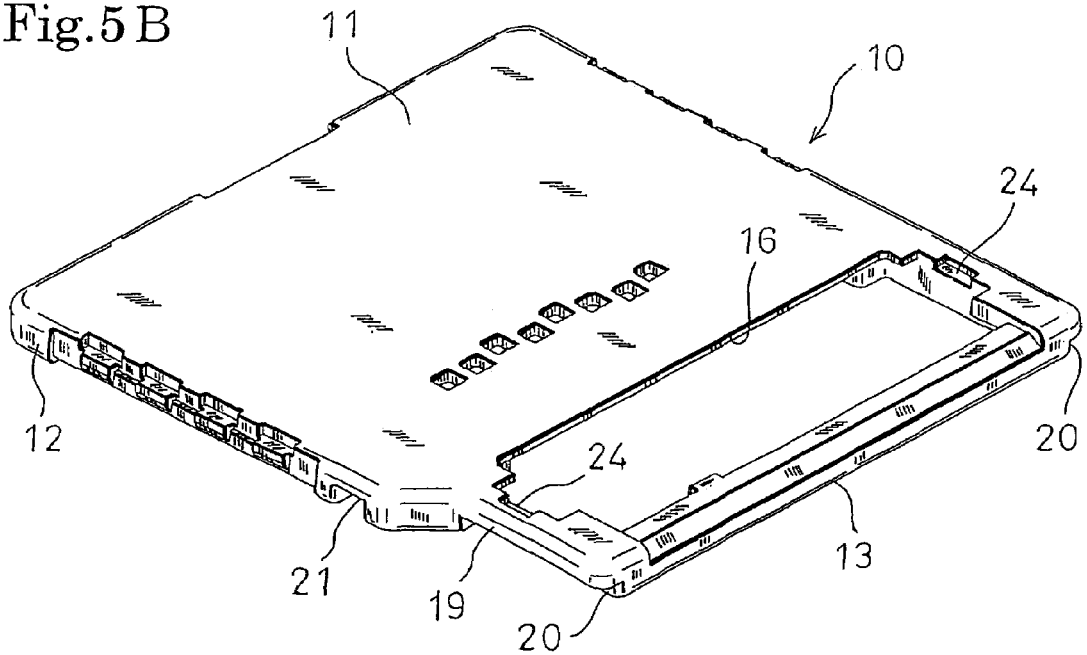
FIG. 5B is an external perspective view of a rear face side of the base.
Figure 6A:
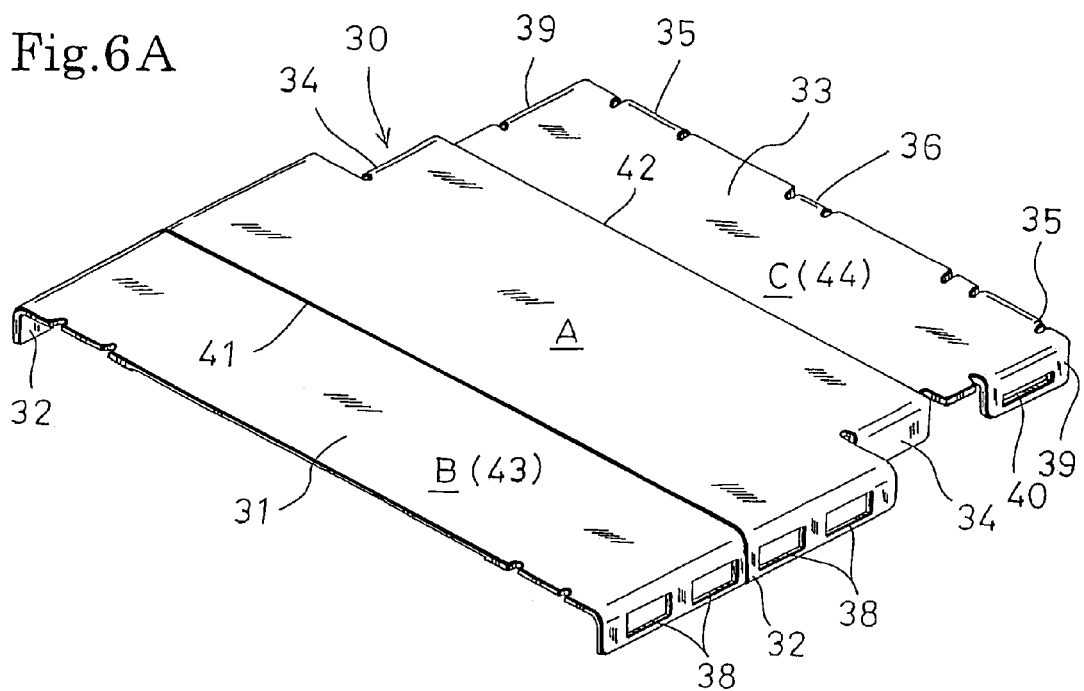
FIG. 6A is an external perspective view of a surface side of a cover.
Figure 6B:
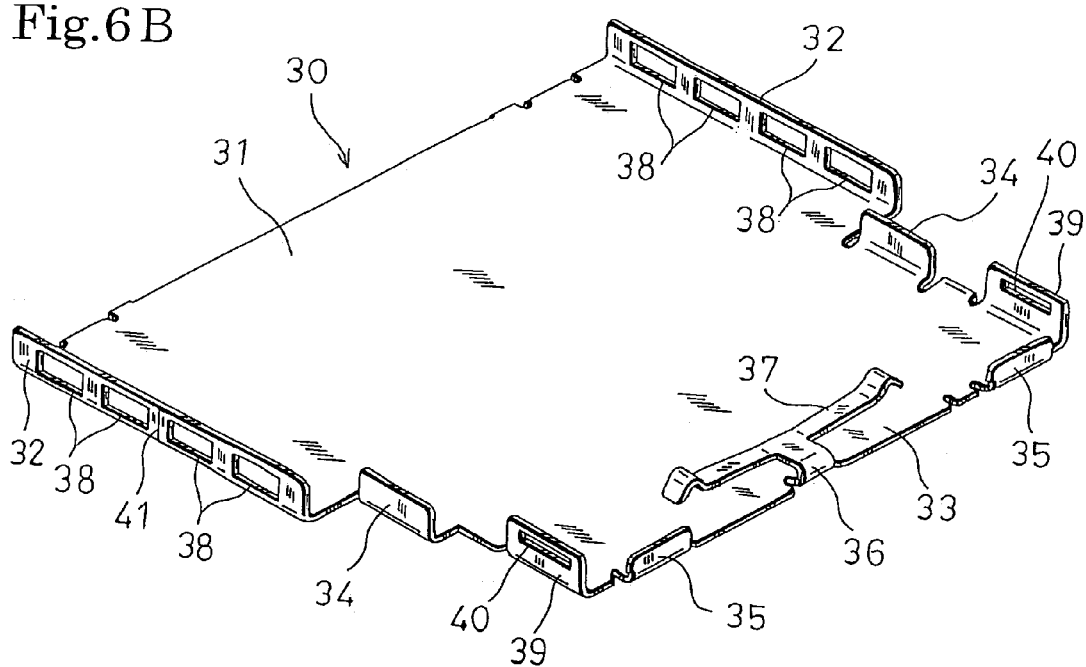
FIG. 6B is an external perspective view of a rear face side of the cover.
Figure 7:
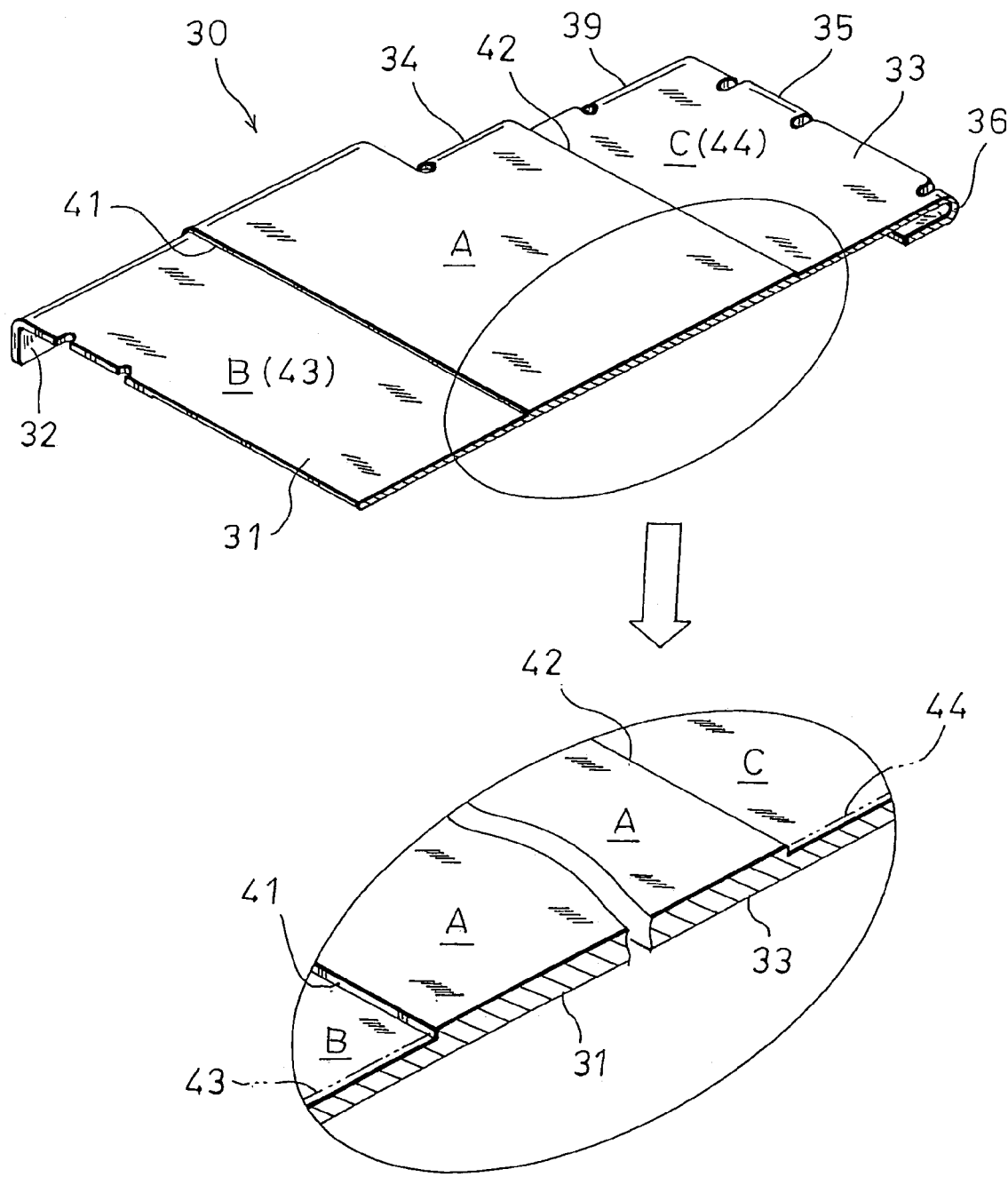
FIG. 7 is a section view of the cover.

The adaptor body 1 shown in FIGS. 1 and 2 is configured by two components, i.e., an insulative base 10 which is shown in FIGS. 3, 4, 5A, and 5B, and which is made of a synthetic resin material, and a conductive cover 30 which is shown in FIGS. 4, 6A, 6B, and 7, and which is formed by a metal plate.

The base 10 shown in FIGS. 3, 4, 5A, and 5B integrally has: a bottom plate 11 which is substantially rectangular, and in which one rear edge is cut away; reinforcing ribs 12 which upstand lengthwise and widthwise in right and left side areas of the front wide portion of the bottom plate 11 in which the width is not narrowed by the cut-away portion; and a side wall 13 which upstands along the peripheral edge of the rear side of the bottom plate 11 in which the width is narrowed by the cut-away portion. A card housing space 14 which is to house the micro SD card 300 is formed between the right and left reinforcing ribs 12, and an insulator housing space 15 for the contact set 50 is formed continuously with the rear side of the card housing space 14. A large contact exposing window 16 is opened in the bottom face of the insulator housing space 15. A locking member housing space 17 is formed in adjacent to one side of the card housing space 14 to communicate with the card housing space 14 through a communication port 18.

In the base 10, disposed are a cut-away portion 19, step portions 20, and locking cut-aways 21 for the adaptor 100 which correspond to the cut-away portion 201, the step portions 202, and the locking cut-aways 203 of the mini SD card 200, respectively. Plural cover engagement hooks 22 are disposed on the right and left outer side faces of the wide portion of the base 10, cover engagement grooves 23 are disposed in right and left inner side portions of the wide portion of the base 10, and cover engagement grooves 24 are disposed along right and left side edges of the contact exposing window 16 in the rear face of the base 10.

In the cover 30 shown in FIGS. 4, 6A, 6B, and 7, integrally formed are: a rectangular main portion 31 which covers the upper face of the front wide portion of the base 10; first elongated portions 32 which hang from the right and left side edges of the main portion 31 to cover the right and left outer side faces of the front wide portion of the base 10; a second elongated portion 33 which is rearward elongated flushly from the rear edge of the main portion 31 to cover the upper face of the insulator housing space 15 of the base 10, and which is slightly narrower than the main portion 31; first engagement hooks 34 which are downward elongated from the right and left side edges of a basal end side of the second elongated portion 33; second engagement hooks 35 which are downward elongated from the right and left side portions of the tip end edge of the second elongated portion 33; third engagement hooks 39 which are downward elongated from the right and left side edges of a tip end side of the second elongated portion 33; a U-like folded piece 36 which is elongated from a substantially middle portion of the tip end edge of the second elongated portion 33, and in which an end portion is opposed to the inner face of the second elongated portion 33; and a connecting terminal 37 which is elastically deformable, and which is a plate spring that is elongated in the lateral direction (the juxtaposition direction of the contacts) on the side of the inner face of the second elongated portion 33 while an intermediate portion is continuous to the end portion of the folded piece 36. Plural base engagement holes 38 which serve also as lower holes for caulking are disposed in the first elongated portions 32. Lower holes 40 for caulking are disposed in the third engagement hooks 39.

The cover 30 is produced in the following manner. A flat cover in a developed state is punched out from a metal flat plate (stock), and thereafter boring and bending processes are performed to produce a semifinished product of the cover 30. The semi-finished product of the cover 30 has a front end defined by a main portion 31, and a rear end. A punching step is performed so that the material thickness for an area of a predetermined length from the front end of flat cover, specifically, the plate thicknesses of a substantially front half of the main portion 31 and the first elongated portions 32, which are located in the right and left sides of a half portion, is determined. The material thickness for an area of a predetermined length from the rear end, specifically, the plate thicknesses of: a substantially rear half of a second elongated portion, the second engagement hooks 35 which protruded from this rear half, the folded piece 36, the connecting terminal 37, and the third engagement hooks 39 are slightly smaller in thickness than the material thickness of an area between them, specifically, the plate thicknesses (the thickness of the material) of a substantially rear half of the main portion 31 and the first elongated portions 32 which are in the right and left sides of the first half, a substantially front half of the second elongated portion, and the first engagement hooks 34 which are in the right and left sides of the rear half, whereby two or front and rear steps 41, 42 constituting boundaries between a thick (original thickness) portion and a thinned portion are disposed in the surface of the flat cover which is in a punched and developed state. Insulating layers 43, 44 are formed by applying, for example, insulation coating at a thickness which is equal to or less than the dimensions of the steps 41, 42, to the surface which is outward exposed in front of the front step 41 which is thinned in the semi-finished product of the cover 30, i.e., the surfaces of the substantially front half of the main portion 31 and the first elongated portions 32 which are in the right and left sides of the half portion, and the surface which is outward exposed in rear of the rear step 42, i.e., the surface of the substantially rear half of the second elongated portion. As a result, a product of the cover 30 is obtained. On the surface of the thus obtained cover 30, a conductive area A where films due to the insulating layers 43, 44 are not formed is disposed in a longitudinally intermediate portion of the surface, and insulation areas B, C having films due to the insulating layers 43, 44 are disposed in the front and rear end portion which are located across the conductive area A.

The contact set 50 shown in FIGS. 3, 4, 8A, and 8B is configured by: eleven contacts 60a to 60k which are equal in number to the mini SD card 200 so as to cope with the mini SD card specification; and an insulative insulator 70 which is made of a synthetic resin material, and on which the eleven contacts 60a to 60k are laterally juxtaposed in the insulating state to be integrally held.

Figure 8A:
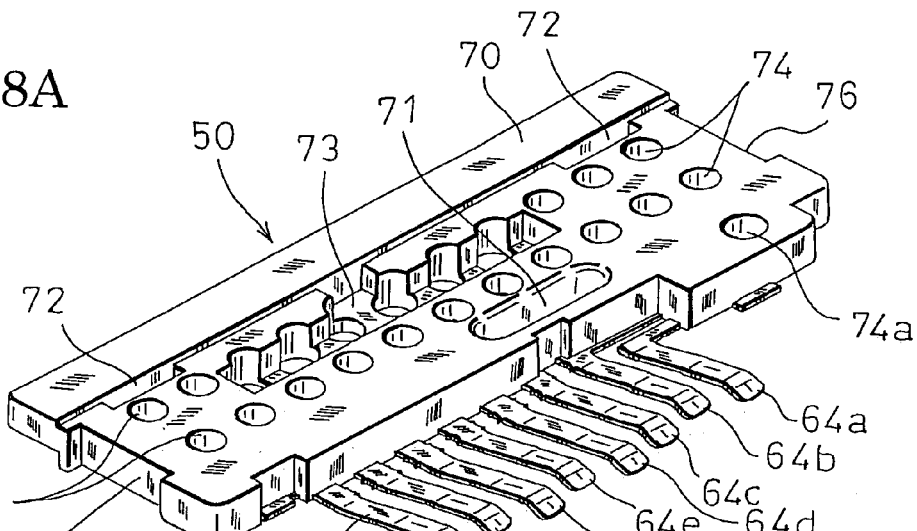
FIG. 8A is an external perspective view of a surface side of a contact set.
Figure 8B:
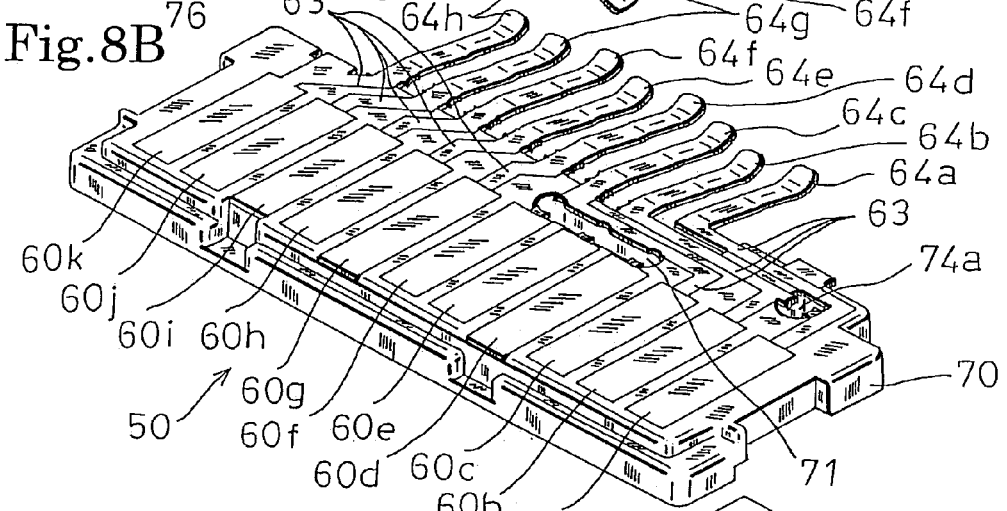
FIG. 8B is an external perspective view of a rear face side of the contact set.
Figure 8C:
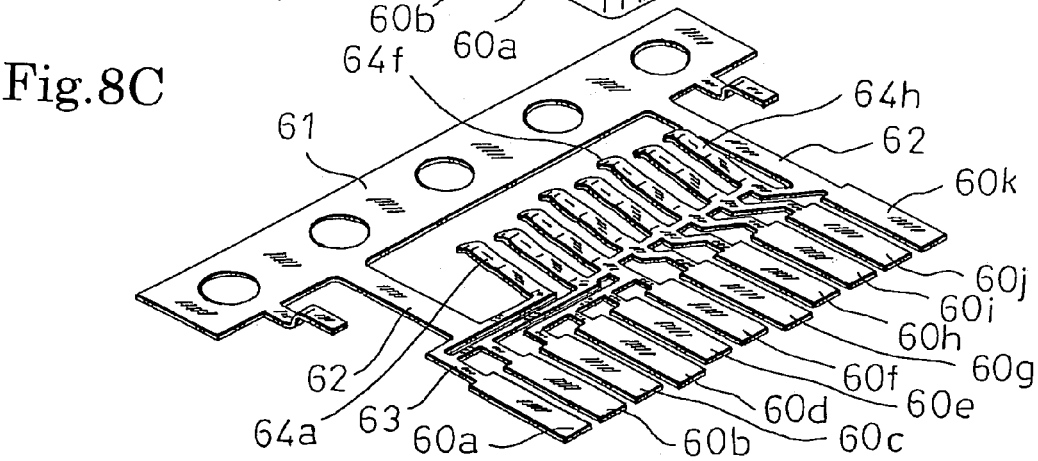
FIG. 8C is an external perspective view of contacts before insert molding.

As shown in FIG. 8C, the eleven contacts 60a to 60k are shaped by punching a conductive thin plate of a metal, in a state where the contacts are continuous to a carrier 61 via connecting pieces 62. Then, the insulator 70 is formed by insert molding on the eleven contacts 60a to 60k in this state, and thereafter the connecting pieces 62 are cut off to be separated together with the carrier 61, whereby an intermediate assembly of the contact set 50 is configured.

Each of the eleven contacts 60a to 60k is formed into a rectangular plate-like shape. Eight contact spring pieces 64a to 64h which are equal in number to the micro SD card 300 so as to cope with the micro SD card specification are elongated in a cantilevered manner from the front ends of the contacts 60a to 60k via connecting portions 63 that are mutually coupled. In the eleven contacts 60a to 60k, the first to eleventh contacts 60a to 60k are sequentially arranged in a direction from left to right as seen from the side of the rear face, four or the first, second, tenth, and eleventh contacts 60a, 60b, 60j, 60k are used for data, the third contact 60c is used for a command, two or the fourth and ninth contacts 60d, 60i are used for grounding, two or the fifth and sixth contacts 60e, 60f are for reserve, the seventh contact 60g is used for power supply, and the eighth contact 60h is used for a clock signal.

Namely, the arrangement of the contacts is identical with that of the contacts 204a to 204k of the mini SD card 200. By contrast, in the eight contact spring pieces 64a to 64h, the first to eighth contact spring pieces 64a to 64h are sequentially arranged in a direction from left to right as seen from the side of the rear face, four or the first, second, seventh, and eighth contact spring pieces 64a, 64b, 64g, 64h are used for data, the third contact spring piece 64c is used for a command, the fourth contact spring piece 64d is used for power supply, the fifth contact spring piece 64e is used for a clock signal, and the sixth contact spring piece 64f is used for grounding. Namely, the arrangement of the contact spring pieces is identical with that of the contacts 303a to 303h of the micro SD card 300.

Figure 9:
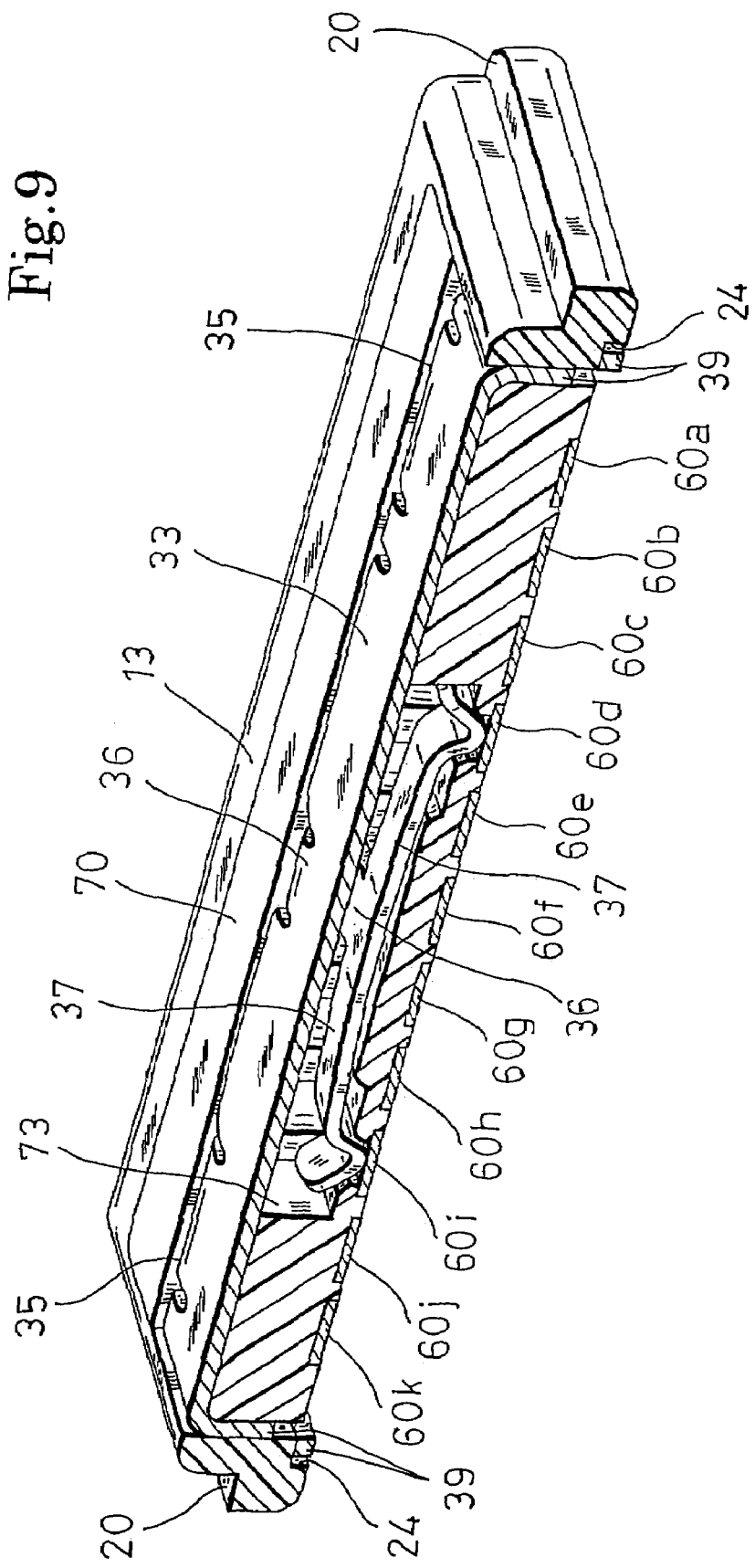
FIG. 9 is a section view showing electrical connecting structures between grounding contacts, and between the grounding contacts and the cover.

In the intermediate assembly of the contact set 50, the insulator 70 is formed into a laterally elongated rectangular parallelepiped shape which is to be fitted into the insulator housing space 15 of the base 10. In the lower face of the insulator 70, the connecting portions 63 and the contacts 60a to 60k are laterally arranged and flushly embedded, and the eight contact spring pieces 64a to 64h are inclinedly protruded in a forward upward sloping manner in the front side of the insulator 70. In the insulator 70, formed are: tool insertion holes 71, 74a for extracting predetermined areas of the connecting portions 63 embedded in the lower face of the insulator; cover engagement grooves 72 into which the second engagement hooks 35 of the cover 30 are to be fittingly inserted; passing grooves 76 through which the third engagement hooks 39 of the cover 30 are passed to the inner sides of the cover engagement grooves 24 in the rear face of the base 10; a housing hole 73 which houses the folded piece 36 and connecting terminal 37 of the cover 30, and which, as shown in FIG. 9, causes one end of the connecting terminal 37 to contact with the fourth grounding contact 60d from the upper side, and the other end to contact with the ninth grounding contact 60i from the upper side; and plural lightening holes 74 for reducing the weight, and for sandwiching the contacts 60a to 60k. One of the lightening holes or the hole 74a functions also as a tool insertion hole.

After the intermediate assembly is configured, the predetermined areas of the connecting portions 63 embedded in the lower face of the insulator 70 are extracted through the tool insertion holes 71, 74a, and at the same time also the mutually coupling portions of the connecting portions 63 outside the insulator 70 are extracted, thereby configuring the contact set 50 shown in FIGS. 3, 4, 8A, and 8B. In the contact set 50, the eight contact spring pieces 64a to 64h are continuously integrated with the corresponding eight contacts 60a to 60c, 60g to 60k via the eight thin connecting portions 63 which are independently separated from one another. The remaining three or fourth grounding contact 60d, and two or fifth and sixth reserve contacts 60e, 60f are separated from the connecting portions 63. In the same manner as the mini SD card 200, the rear ends of the fourth grounding contact 60d and the seventh power supply contact 60g are protruded or deviated in the rearward direction (the adaptor insertion direction) as compared with the other nine contacts 60a to 60c, 60e, 60f, 60h to 60k, so as to contact with contacts of the card connector in advance of the other nine contacts 60a to 60c, 60e, 60f, 60h to 60k. Accordingly, there is a step difference (a difference in protrusion) between the positions of the rear ends of the two or fourth and ninth grounding contacts 60d, 60i (see FIGS. 2 and 8B). A resin-made plug 75 is pressingly inserted and embedded into the tool insertion hole 71 of the contact set 50 (see FIGS. 3 and 4).

The locking member 90 shown in FIGS. 3 and 4 is formed by a plate spring of a thin metal plate which is folded at an intermediate portion, and has a card engagement portion 91 on the free end side which is on one side with respect to the folded portion. Alternatively, the locking member 90 may be formed integrally with the base 10 by a resin.

Figure 10:
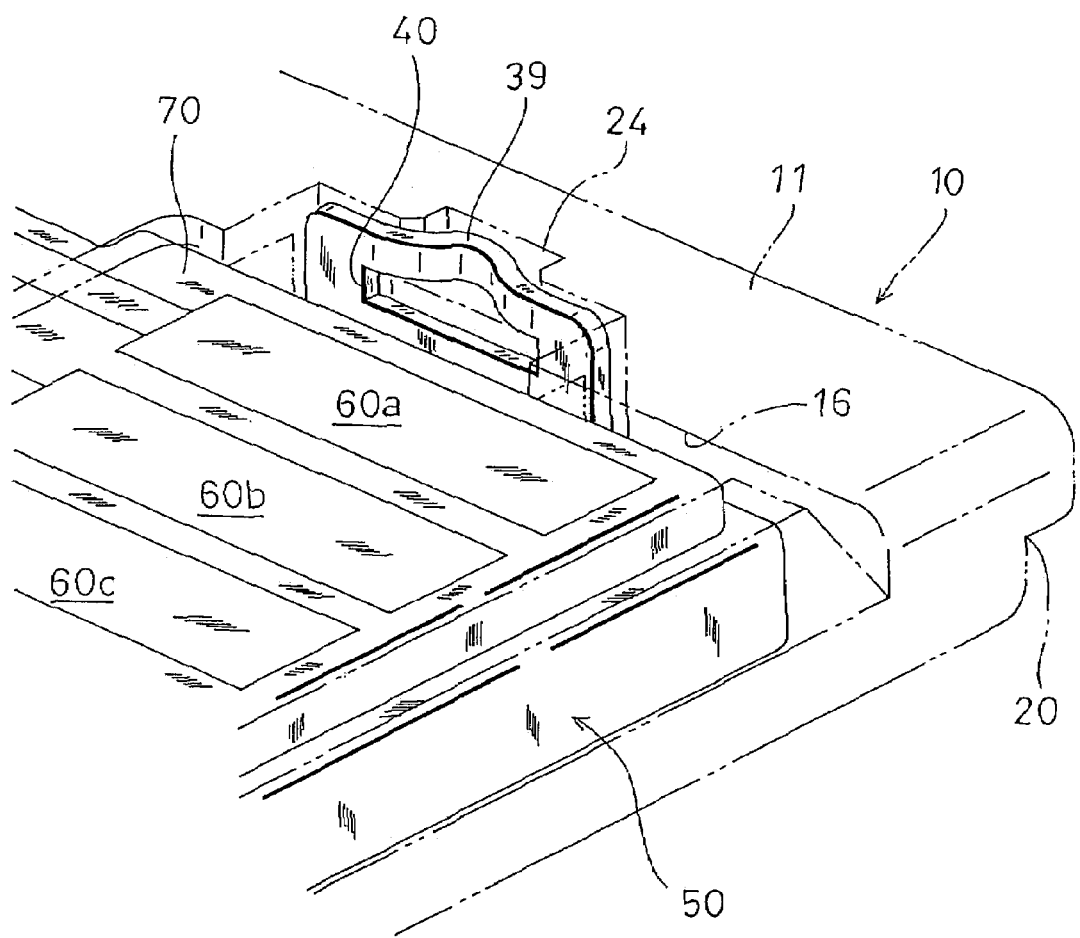
FIG. 10 is a perspective view of a cover-caulked portion on the rear face side of the adaptor.

The adaptor 100 (the adaptor body 1) is assembled in the following manner. The insulator 70 of the contact set 50 is fitted into the insulator housing space 15 of the base 10 from the upper side. The eleven contacts 60a to 60k of the contact set 50 are exposed from the rear face of the base 10 through the contact exposing window 16 of the bottom face of the insulator housing space 15, and the eight contact spring pieces 64a to 64h of the contact set 50 are protruded into a rear portion of the card housing space 14 of the base 10. Namely, the contact set 50 is incorporated into the base 10. The locking member 90 is incorporated into the locking member housing space 17 of the base 10, the other side of the locking member 90 with respect to the folded portion is fixed, and the card engagement portion 91 which is formed on the free end side of the locking member 90 that is on one side with respect to the folded portion is protruded into the card housing space 14 through the communication port 18 (the state shown in FIG. 3). Then, the first engagement hooks 34 of the cover 30 are inserted into the cover engagement grooves 23 of the base 10, the second engagement hooks 35 of the cover 30 are inserted into the cover engagement grooves 72 of the insulator 70, and the third engagement hooks 39 of the cover 30 are inserted into the passing grooves 76 of the insulator 70. While fitting the folded piece 36 and the connecting terminal 37 of the cover 30 into the housing hole 73 of the insulator 70, the cover 30 covers the base 10 from the upper side so that the reinforcing ribs 12 and the upper open faces of the card housing space 14 and the locking member housing space 17 in the front wide portion of the base 10 are integrally covered with the main portion 31 of the cover 30. The second elongated portion 33 of the cover 30 is overlappingly joined to the upper face of the insulator 70, and the insulator 70 is sandwiched between the bottom plate 11 of the base 10 and the second elongated portion 33 of the cover 30. The right and left outer side faces of the front wide portion of the base 10 are overlappingly covered with the first elongated portions 32 of the cover 30, and the cover engagement hooks 22 of the base 10 are fitted into the base engagement holes 38 of the cover 30. Finally, the lower edges of the base engagement holes 38 of the first elongated portions 32 of the cover 30 are inward caulked as shown in FIGS. 1 and 2, and the lower edges of the lower holes 40 of the third engagement hooks 39 of the cover 30 which are passed inside the cover engagement grooves 24 in the rear face of the base 10 are outward caulked as shown in FIG. 10 to fix the cover 30 to the base 10 in the covered state, thereby completing the assembly.

In the assembly-completed state, as shown in FIGS. 1 and 2, the adaptor 100 has the outer dimensions (the dimensions of the length, the width, and the thickness) which are substantially identical with those of the mini SD card 200 corresponding to the mini SD card specification. In the same manner as the mini SD card 200, the eleven contacts 60a to 60k are exposed from the rear face of the rear end portion with being laterally juxtaposed, the cut-away portion 19 is formed by cutting away one rear edge, the upward step portions 20 are disposed in the right and left side edges of the surface of the rear end portion in which the width is narrowed by the cut-away portion 19, and the locking cut-aways 21 are disposed on the right and left sides of the surface of the wide portion which is on the forward side with respect to the cut-away portion 19. Therefore, the adaptor can be attached to a card connector for the mini SD card 200.

A card insertion port 2 is opened in the front face, the card housing space 14 communicates with the card insertion port 2, and the eight cantilevered contact spring pieces 64a to 64h are laterally juxtaposed in the rear portion (inner portion) of the card housing space 14. Therefore, the micro SD card 300 can be attached to the card housing space 14 through the card insertion port 2, and the free end portions of the eight contact spring pieces 64a to 64h can be contacted with the eight contacts 303a to 303h of the attached micro SD card 300 to be electrically connected therewith.

In a substantially longitudinally intermediate portion of the surface, the conductive area A which is disposed in the longitudinally intermediate portion of the surface of the cover 30 is correspondingly exposed. In the front and rear end portions of the surface, the insulation areas B, C which are disposed in the front and rear end portion of the surface of the cover 30 are correspondingly exposed. As shown in FIG. 9, the connecting terminal 37 which is formed integrally with the cover 30 is housed together with the folded piece 36 in the housing hole 73 formed in the insulator 70 of the incorporated contact set 50, and, by the elasticity of the terminal itself from the upper side, one end is pressed against and contacted with the fourth grounding contact 60d, and the other end is pressed against and contacted with the other or ninth grounding contact 60i. As a result of the contacts, electrical connection is established between the two grounding contacts 60d, 60i which are in the eleven contacts 60a to 60k, and which are not adjacent to each other, and between the grounding contacts 60d, 60i and the cover 30. The joining faces between the base 10 and the main portion 31 and first elongated portions 32 of the cover 30, and the joining face of the insulator 70 with the second elongated portion 33 of the cover 30 are recessed from their outer peripheries by a degree corresponding to the plate thickness of the cover 30, so that the surfaces of the main portion 31 and first elongated portions 32 of the cover 30 are flush with the surface of the base 10 surrounding them, and the surface of the second elongated portion 33 of the cover 30 is flush with that of the insulator 70 surrounding it.

The micro SD card 300 is attached to the thus assembled adaptor 100 in the following manner. The micro SD card 300 in the normal insertion posture in which the longitudinal and front/back directions are oriented to the normal directions is inserted into the card housing space 14 through the card insertion port 2. The micro SD card 300 is fitted to an inner area of the card housing space 14 while the side portion where the locking cut-away 302 is disposed pushes back the card engagement portion 91 of the locking member 90 against the spring force. The eight contacts 303a to 303h which are disposed on the rear face side of the rear end portion of the micro SD card 300 are contacted with the free end portions of the eight contact spring pieces 64a to 64h which are juxtaposed in the rear portion of the card housing space 14, to be electrically connected thereto. When the micro SD card 300 is further pushed into the card housing space 14, the rear end portion of the micro SD card 300 bumps against the front side face of the insulator 70 which rises in the rear end of the card housing space 14, thereby restricting further insertion. The card engagement portion 91 of the locking member 90 is opposed to the locking cut-away 302 of the micro SD card 300, and engaged with the locking cut-away 302 by the spring force, thereby preventing the micro SD card 300 from dropping off.

When the micro SD card 300 attached to the adaptor 100 is to be extracted, the front-end portion of the micro SD card 300 is nipped, and the micro SD card 300 is forward pulled against the spring force of the locking member 90. Then, the engagement state between the locking cut-away 302 of the micro SD card 300 and the card engagement portion 91 of the locking member 90 is canceled, and the micro SD card 300 can be extracted from the adaptor 100.

In the micro SD card 300 attached to the adaptor 100, the eight contacts 303a to 303h are electrically connected to the corresponding eight contacts 60a to 60c, 60g to 60k. When the adaptor 100 is attached in the normal insertion posture to a card connector for the mini SD card 200, therefore, the eight contacts 303a to 303h of the micro SD card 300 are electrically connected to corresponding eight contacts of the card connector through the corresponding eight contacts 60a to 60c, 60g to 60k. As a result, in the same manner as the mini SD card 200, the micro SD card 300 is enabled to be used in the card connector for the mini SD card 200.

As seen form the above description, electrical connection is established between the two grounding contacts 60d, 60i which are in the eleven contacts 60a to 60k, and which are not adjacent to each other, and between the grounding contacts 60d, 60i and the cover 30. Consequently, grounding contacts which may constitute an internal floating ground can be eliminated from the adaptor, and the conductive area A (the metal surface) which is in the surface of the cover 30 is correspondingly exposed in the longitudinally intermediate portion of the surface and the right and left side faces of the portion. Therefore, static electricity of the user is allowed to escape to the ground through the cover 30, thereby preventing an electronic component from being electrostatically broken down. Furthermore, the insulation areas B, C (the insulating layers 43, 44) which are in the surface of the cover 30 are correspondingly exposed in the front end portion of the surface, the right and left side faces of the portion, and the rear end portion of the surface. When the adaptor is erroneously inserted into a card connector for the mini SD card 200 in a posture other than the normal insertion posture (in a posture where the front and rear relationship and the front and back relationship are inverted), therefore, it is possible to prevent the contacts of the card connector from being contacted by the erroneous insertion with the metal surface of the cover 30 and causing electrostatic breakdown. Even in the case of erroneous insertion of the adaptor 100, the insulation areas B, C in the surface of the cover 30 prevent electrostatic breakdown from occurring. Because of this and the like, the insulation areas correspond to the electrical insulation required area on the surface side which is specified in the standard for a memory card adaptor.

The steps 41, 42 are disposed in the surface of the cover 30 by partly reducing the plate thickness (material thickness) of the cover 30, and the insulating layers 43, 44 are formed on the surface of the thinned cover 30 at the thickness which is equal to less than the steps 41, 42. Therefore, the arbitrary insulation areas B, C can be disposed on the surface of the cover 30 which cooperates with the base 10 to constitute the adaptor body 1. Specifically, the plate thicknesses of front and rear end portions of the cover 30 are partly reduced to dispose the two or front and rear steps 41, 42, and the insulating layers 43, 44 are formed at the thickness which is equal to less than the steps 41, 42 on the surfaces in front and rear of the front and rear step 41, 42 where the plate thickness of the cover 30 is reduced. Therefore, the insulation areas B, C which correspond to the surfaces of the front and rear end portions of the cover 30 cooperating with the base 10 to constitute the adaptor body 1, i.e., the electrical insulation required area on the surface side which is specified in a memory card adaptor can be disposed. Consequently, the metal cover 30 can be used for a substantially whole face of the surface of the adaptor 100 including the electrical insulation required area on the side of the surface of the adaptor 100. The thickness of the adaptor 100 is specified in the standards. When a metal cover in which an insulating layer is formed on the whole surface, the material thickness of the whole cover must be reduced by a dimension corresponding to the insulating layer. This causes the rigidity of the adaptor to be reduced. In other words, in order to maintain the rigidity of the adaptor, the thickness of the adaptor must be increased. By contrast, the insulation areas B, C are formed on the surface of the cover 30 as described above. Consequently, the arbitrary insulation areas B, C can be disposed on the surface of the metal cover 30 with reducing the rigidity of the adaptor 100 as little as possible, and without increasing the thickness of the adaptor 100. Specifically, the insulation areas B, C are formed on the surfaces of the front and rear end portions of the cover 30 as described above. Therefore, the insulation areas B, C which correspond to the surfaces of the front and rear end portions of the metal cover 30, i.e., the electrical insulation required area on the surface side which is specified in a memory card adaptor can be disposed with reducing the rigidity of the adaptor 100 as little as possible, and without increasing the thickness of the adaptor 100.

The cover 30 is fixed to the base 10 by: superimposing a part of the cover on the right and left outer side faces of the front wide portion of the base 10; and caulking the lower edges of the base engagement holes 38 of the first elongated portions 32 of the cover 30 into which the cover engagement hooks 22 of the base 10 are fitted through the base engagement holes 38, and the lower edges of the lower holes 40 of the third engagement hooks 39 of the cover 30 which are passed inside the cover engagement grooves 24 in the rear face of the base 10. Therefore, the base 10, the cover 30, and the insulator 70 of the contact set 50 which is an interior component can be firmly integrated with one another in a reduced space. Furthermore, the first elongated portions 32 and the third engagement hooks 39 are caulked in the opposite directions, and hence the components can be coupled and integrated together without causing rattling.

Therefore, the insulation areas B, C can be arbitrarily set on the side of the surface of the adaptor 100 without increasing the thickness of the adaptor 100, and while maintaining the rigidity of the adaptor 100. The insulation areas B, C are disposed in the front and rear end portions of the surface of the adaptor 100 corresponding to the electrical insulation required area on the surface side which is specified in the standard for a memory card adaptor.

In order to facilitate insertion and extraction of the adaptor 100, preferably, the insulating layers 43, 44 are formed on the cover 30 so that the frictional resistance of the insulation area B of the front end portion (the end portion which is nipped when the adaptor 100 is to be inserted or extracted) of the surface of the adaptor 100 is higher than that of the insulation area C of the rear end portion, thereby allowing the adaptor 100 to be surely nipped (antislip). In accordance with this, the frictional resistance of the rear end portion (the end portion to be inserted into a card connector) of the surface the adaptor 100 is lower than that of the insulation area B of the front end portion, and hence the insertion/extraction resistance of the adaptor 100 can be reduced.

The insulating layer 43 of the front end portion of the surface of the cover 30 which serves as the insulation area B of the front end portion of the surface of the adaptor 100 may be formed in the strictly identical manner with the insulating layer 44 of the rear end portion of the surface of the cover 30 which serves as the insulation area C of the rear end portion of the surface of the adaptor 100. When they are formed in a different manner, however, the difference in frictional resistance can facilitate insertion and extraction of the adaptor 100 as described above, and differences in appearance, texture, tactile sensation, and the like can prevent, for example, erroneous insertion of the adaptor 100 from occurring.

Figure 11:
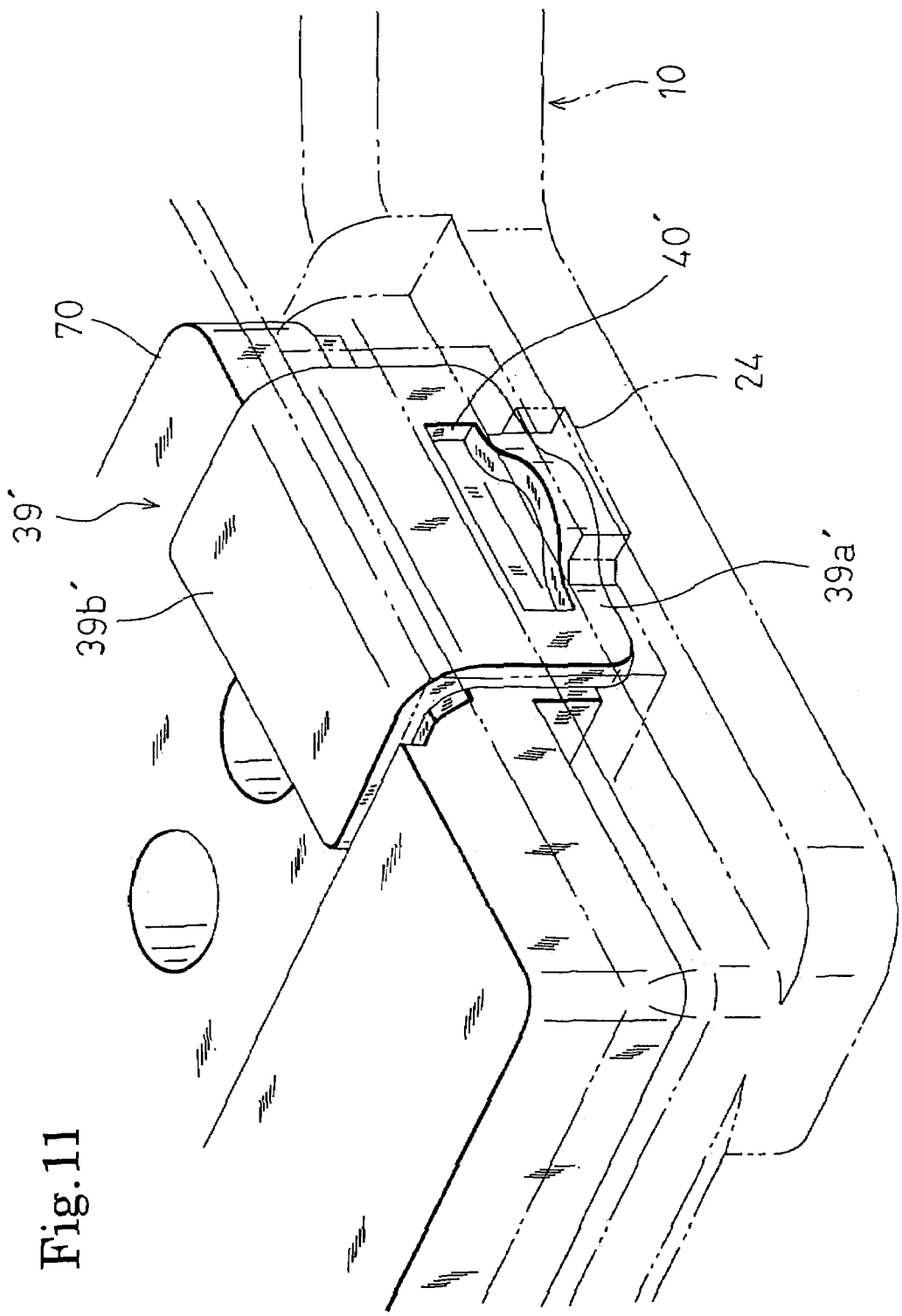
FIG. 11 is a perspective view of a caulked portion by an L-shaped metal fitting for caulking.
Figure 13A:
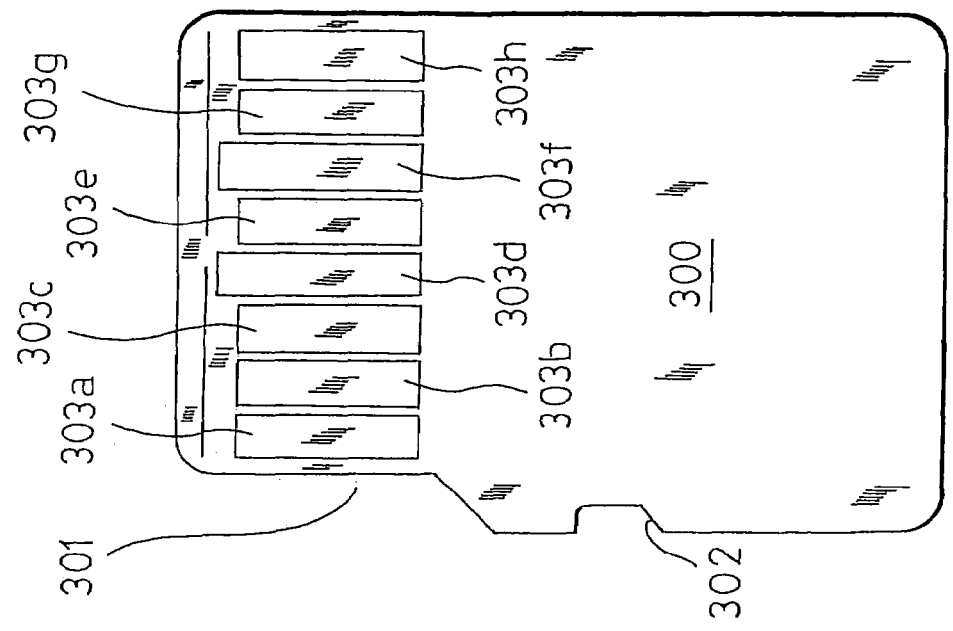
FIG. 13A is a front face view of a micro SD card.
Figure 13B:
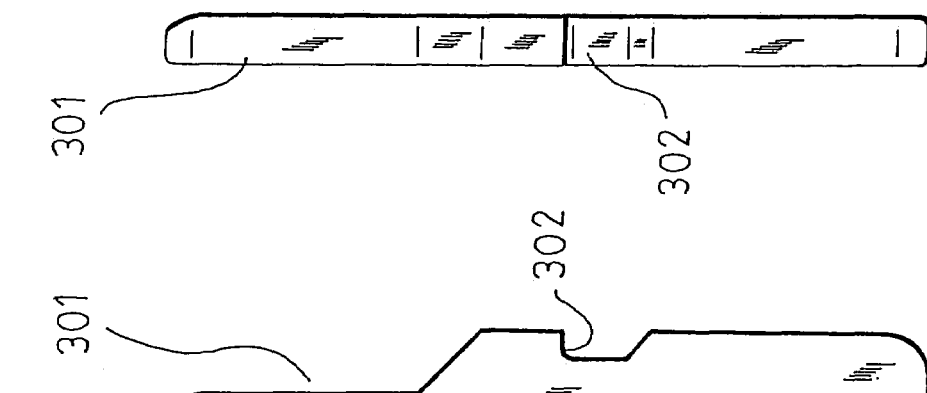
FIG. 13B is a side view of the micro SD card.
Figure 13C:
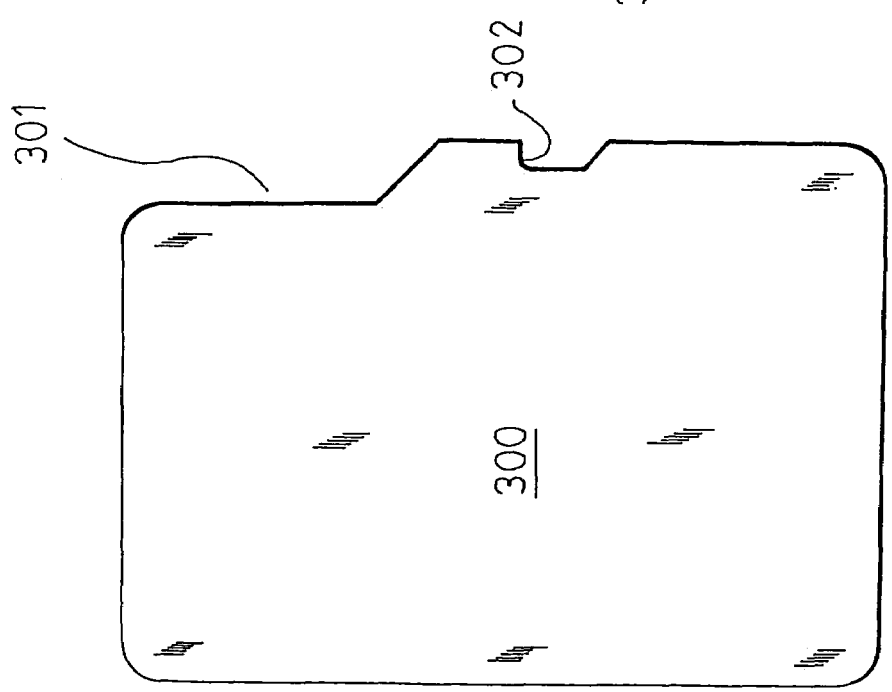
FIG. 13C is a rear face view of the micro SD card.

In the case where the second elongated portion 33 for sandwiching the insulator 70 of the contact set 50 between that portion and the bottom plate 11 of the base 10 cannot be disposed in the cover 30, an L-shaped metal fitting 39' for caulking shown in FIG. 11 may be used in place of the third engagement hooks 39 of the cover 30 so that the insulator 70 can be fixed by caulking to the base 10 in the same manner as the cover 30. The metal fitting 39' can fix the insulator 70 to the base 10 in the following manner. One pieces 39a' in which lower holes 40' for caulking are disposed in the same manner as the third engagement hooks 39 are inserted into the passing grooves 76 of the insulator 70. Other pieces 39b' are overlappngly joined to the right and left sides of the surface of the insulator 70. The lower edges of the lower holes 40' of the one pieces 39a' which are passed inside the cover engagement grooves 24 in the rear face of the base 10 are outward caulked, thereby fixing the insulator 70 to the base 10.

In the above embodiment, an example of the preferred embodiment of the invention has been described. The invention is not restricted to it, and may be variously modified without departing from the spirit of the invention. For example, the invention can be preferably applied also to memory card adaptors of other kinds except a memory card adaptor which enables the micro SD card 300 to be used in a card connector for an SD card.

What is claimed is:

1. A memory card adaptor which enables a small memory card to be used in a card connector for a large memory card that is larger than the small memory card, wherein, in a surface of a metal cover which cooperates with a resin base to constitute an adaptor body having a shape corresponding to an outer shape of the large memory card, a step is disposed by partly reducing a material thickness of said cover, and an insulating layer a thickness of which is equal to less than said step is formed on a surface of said thinned cover.

2. A memory card adaptor according to claim 1, wherein said cover is fixed to said base by caulking a part of said cover.

3. A memory card adaptor according to claim 1, wherein;
said metal cover has an elastically displaceable connecting terminal integrally formed with said metal cover, said connecting terminal establishes a ground between electrical ground contacts and said metal cover.

* * * * *